(12) United States Patent
Krieg et al.

(10) Patent No.: US 12,123,832 B2
(45) Date of Patent: Oct. 22, 2024

(54) APPARATUS FOR IDENTIFYING SUBSTANCES

(71) Applicant: Gunther Krieg, Karlsruhe (DE)

(72) Inventors: Gunther Krieg, Karlsruhe (DE); Dirk Fey, Neewiller (FR); Juergen Bohleber, Bühl (DE); Thomas Bohe, Baden-Baden (DE); Bob Ansay, Loffenau (DE); Christian Klaus Stein, Stutensee (DE)

(73) Assignee: Gunther Krieg, Karlsruhe (DE)

( * ) Notice: Subject to any disclaimer, the term of this patent is extended or adjusted under 35 U.S.C. 154(b) by 333 days.

(21) Appl. No.: 16/323,053

(22) PCT Filed: Aug. 1, 2017

(86) PCT No.: PCT/DE2017/200077
§ 371 (c)(1),
(2) Date: Jun. 25, 2020

(87) PCT Pub. No.: WO2018/024300
PCT Pub. Date: Feb. 8, 2018

(65) Prior Publication Data
US 2020/0326281 A1 Oct. 15, 2020

(30) Foreign Application Priority Data
Aug. 4, 2016 (DE) ...................... 10 2016 214 469.0

(51) Int. Cl.
*G01N 21/64* (2006.01)
*B07C 5/342* (2006.01)
(Continued)

(52) U.S. Cl.
CPC ....... *G01N 21/6408* (2013.01); *B07C 5/3427* (2013.01); *B29B 17/02* (2013.01);
(Continued)

(58) Field of Classification Search
CPC .............. G01N 21/6408; G01N 21/85; G01N 2021/6419; G01N 2021/6421;
(Continued)

(56) References Cited

U.S. PATENT DOCUMENTS

| 4,686,371 A * | 8/1987 | Birch | G01N 21/6408 |
| | | | 250/461.1 |
| 5,108,932 A * | 4/1992 | Wolfbeis | G01N 21/6428 |
| | | | 436/124 |

(Continued)

FOREIGN PATENT DOCUMENTS

| DE | 43 12 915 A1 | 10/1994 |
| DE | 43 40 914 A1 | 6/1995 |

(Continued)

OTHER PUBLICATIONS

Print screen from rp-photonics.com about Yag lasers (printsreen taken Oct. 2021).*

*Primary Examiner* — Mohamed K Amara
(74) *Attorney, Agent, or Firm* — Seed IP Law Group LLP

(57) ABSTRACT

Apparatus and methods for identifying substances in a material include at least one light source configured to irradiate a sample of the material with light of at least one wavelength. A detector is configured to detect light re-emitted or transmitted by the sample. An analysis device analyzes the detected light by UV/VIS spectroscopy, fluorescence spectroscopy, Raman spectroscopy, or absorption spectroscopy, and generates a first identification result for at least one substance of the sample. Further, the analysis device generates a second identification result in response to the first identification result being an ambiguous identification result. The second identification result may be generated by fluorescence light decay time analysis (FLZA). At least one substance is at least partially identified based on the first (Continued)

identification result or based on the first and second identification results.

22 Claims, 8 Drawing Sheets

(51) Int. Cl.
 *B29B 17/02* (2006.01)
 *G01N 21/85* (2006.01)
(52) U.S. Cl.
 CPC ...... *G01N 21/85* (2013.01); *B29B 2017/0279* (2013.01); *G01N 2021/6419* (2013.01); *G01N 2021/6421* (2013.01); *G01N 2021/8592* (2013.01); *G01N 2201/0697* (2013.01)
(58) Field of Classification Search
 CPC .... G01N 2021/8592; G01N 2201/0697; B07C 5/3427; B29B 17/02; B29B 2017/0279; F16F 15/145
 See application file for complete search history.

(56) References Cited

U.S. PATENT DOCUMENTS

| | | | | |
|---|---|---|---|---|
| 5,444,335 | A * | 8/1995 | Matsumoto | H01J 11/18 313/493 |
| 5,464,587 | A * | 11/1995 | Lippitsch | G01N 21/6408 422/82.07 |
| 5,510,619 | A | 4/1996 | Zachmann et al. | |
| 5,548,124 | A * | 8/1996 | Takeshima | G01N 21/6408 250/458.1 |
| 6,911,327 | B2 | 6/2005 | McMillan | G01N 21/274 702/19 |
| 7,113,275 | B2 * | 9/2006 | Gardner, Jr. | G01N 21/6458 356/301 |
| 7,245,371 | B2 * | 7/2007 | Wang | G01J 3/44 356/318 |
| 7,359,040 | B1 * | 4/2008 | Pendell-Jones | G01N 21/64 356/73 |
| 7,933,013 | B2 * | 4/2011 | Li | G01N 21/631 356/73 |
| 8,239,139 | B2 * | 8/2012 | Mycek | A61B 5/0084 703/2 |
| 8,395,770 | B1 * | 3/2013 | Hug | G01N 21/65 356/417 |
| 9,632,030 | B1 * | 4/2017 | Houston | G01N 15/1429 |
| 9,833,145 | B2 * | 12/2017 | Jeong | A61B 1/015 |
| 9,840,696 | B2 * | 12/2017 | Izsvak | C12N 9/1241 |
| 9,851,291 | B2 * | 12/2017 | Silcott | G01N 15/1429 |
| 9,970,876 | B2 * | 5/2018 | Sackett | G01N 21/65 |
| 10,012,603 | B2 * | 7/2018 | Sackett | G01N 23/223 |
| 10,533,943 | B2 * | 1/2020 | Krieg | B07C 5/3427 |
| 11,326,057 | B2 * | 5/2022 | Langhals | B29B 17/02 |
| 2002/0109110 | A1 * | 8/2002 | Some | G01N 21/9501 250/559.4 |
| 2003/0205682 | A1 * | 11/2003 | Kapoor | G01J 3/4406 250/458.1 |
| 2004/0069928 | A1 * | 4/2004 | Sagatelyan | H04N 5/2353 250/208.1 |
| 2004/0099813 | A1 * | 5/2004 | Eggeling | G01N 21/6408 250/459.1 |
| 2005/0095715 | A1 | 5/2005 | Hubbard et al. | |
| 2007/0018116 | A1 * | 1/2007 | Lustenberger | G01N 21/6458 250/458.1 |
| 2007/0096039 | A1 * | 5/2007 | Kapoor | G01J 3/433 250/458.1 |
| 2008/0265177 | A1 * | 10/2008 | Connally | G01N 21/6458 250/461.2 |
| 2009/0184259 | A1 * | 7/2009 | Ma | G01N 21/6456 250/483.1 |
| 2011/0180726 | A1 * | 7/2011 | Gratton | G01J 3/4406 250/459.1 |
| 2012/0025075 | A1 * | 2/2012 | Moore | G02B 21/367 250/307 |
| 2012/0202299 | A1 * | 8/2012 | Lenoble | H01L 31/103 436/501 |
| 2012/0245473 | A1 * | 9/2012 | Mycek | G01N 21/474 600/479 |
| 2012/0299476 | A1 * | 11/2012 | Roberts | B60Q 1/2607 315/77 |
| 2013/0056398 | A1 * | 3/2013 | Adams | B07C 5/342 209/587 |
| 2014/0308679 | A1 * | 10/2014 | Thompson | G01N 21/6428 250/236 |
| 2014/0363840 | A1 * | 12/2014 | Mycek | G01N 21/6456 435/29 |
| 2015/0247018 | A1 * | 9/2015 | Yang | C08J 11/105 435/71.1 |
| 2018/0038793 | A1 * | 2/2018 | Krieg | G01N 21/6408 |

FOREIGN PATENT DOCUMENTS

| | | | |
|---|---|---|---|
| DE | 44 33 937 A1 | 3/1996 | |
| DE | 198 16 881 A1 | 10/1999 | |
| DE | 10 2012 012 772 A1 | 12/2013 | |
| EP | 3122814 B1 * | 12/2021 | ............ B07C 5/00 |
| TW | I468653 B | 1/2015 | |
| WO | 98/19800 A1 | 5/1998 | |

* cited by examiner

APPARATUS FOR IDENTIFYING SUBSTANCES

BACKGROUND

Technical Field

The disclosure relates to apparatus and methods for identifying one or more substances in a material.

Description of the Related Art

Recently, the recycling of plastics has become increasingly important. Plastic waste already has a significant impact on the environment itself, through water pollution or the ever-increasing quantity of plastic waste. In addition, the manufacturing of plastics requires an exponentially increasing quantity of crude oil—currently more than 500 million tons per year. A solution to this problem is provided by plastics recycling, in which used materials, i.e., materials that have been processed in products and are no longer needed, are converted into recyclable materials, i.e., materials that are suitable for reprocessing in products. In doing so, this can also conserve the resources required for the manufacturing of the respective materials.

In addition, the control of product quality or color is an essential quality criterion in numerous technical processes. For example, in the manufacturing of plastic containers—in particular, plastic containers for the beverage industry using granulated recycling material—the separation and sorting of different color fractions, different types of plastic, e.g., polyethylene, polyamide, polyvinyl chloride, nylon, silicone, etc., the detection and sorting out of fragments contaminated with, for example, petrol, diesel, benzene, toluene, xylene, etc., are necessary in order to enable re-use in the food industry. In order to achieve this goal, it must be possible to distinguish recyclable pure basic materials from contaminated materials or substances and separate them. In addition, it is desirable if fragments of different colors can also be sorted into pure color fractions.

A further problem is posed by additives that are deliberately added to plastics. For example, certain flame retardants are added to plastics to prevent them from igniting. They are used, among other things, in electronic equipment or in automobiles, to prevent or at least slow down or inhibit ignition. Due to their partial persistence and tendency towards bioaccumulation, they are increasingly being replaced by other, less problematic flame retardants. Ultimately, however, they can still be found in old appliances and must therefore at least be taken into account when recycling.

Various optical methods have become known for the detection and identification of plastics. DE 43 12 915 A1, for example, shows an apparatus for the separation of plastics by type using IR spectroscopy. However, this has the disadvantage that black-colored plastics cannot be detected selectively using this technique, and therefore cannot be separated by type.

WO 98/19800 discloses a system for sorting a variety of polymers from secondary raw materials through the use of Raman spectroscopy. However, since Raman spectroscopy is characterized by very low spectra intensities compared to other spectroscopic methods, it is not suitable for large-scale applications, i.e., the identification of several tons of substances per hour.

DE 198 16 881 discloses a method and apparatus for the separation of plastics, with which a stream of plastic material reduced to fragments is conveyed on a conveyor belt. The material flow is scanned perpendicular to the direction of transport with a laser beam, and the optical radiation re-emitted by the fragments is spectroscopically analyzed. Based upon the detection results, the individual fragments are classified into different groups and separated into separate fractions by a separation system—for example, by way of timed nozzles.

Additional methods for the detection and identification of plastics have become known, for example, from DE 10 2012 012 772.3 or US 2005/0095715.

However, it is problematical that such methods are not sufficiently accurate, particularly for chemically similar plastics. A further problem is that, even with one of the known methods, markers for the plastic are required for its identification, which, however, is impracticable or extremely costly.

BRIEF SUMMARY

The present disclosure relates to an apparatus for identifying one or more substances in a material—in particular, wherein the material is present in granulate form—comprising at least one light source—which may be provided in the form of a laser—for irradiating a sample of the material with light of at least one wavelength, a detector for detecting the light re-emitted and/or transmitted by the sample, and an analysis device for the spectroscopic analysis of the detected light.

The present disclosure further relates to a method for identifying one or more substances in a material—in particular, wherein the material is present in granulate form—wherein at least one light source—which may be provided in the form of a laser—is used to irradiate a sample of the material with light of at least one wavelength, and the light re-emitted and/or transmitted by the sample of the material is detected by way of a detector, and the detected light is spectroscopically analyzed by an analysis device.

Although the present disclosure is applicable in any field, the present disclosure is described in relation to recycling.

Although the present disclosure is applicable for or to any material or substances, the present disclosure is described in relation to plastics.

Although the present disclosure is applicable to any form of material or substances, the present disclosure is described in relation to granulate-like material or substances.

In various embodiments, the present disclosure provides a method and an apparatus that can quickly and reliably identify substances in, from, and/or on a material. The present disclosure provides various embodiments that can reliably differentiate between, in particular, chemically similar materials with additives. In some embodiments, the present disclosure provides a method and an apparatus that can be easily implemented or executed, and which can also analyze and identify mass flows of material resulting from recycling. In some embodiments, the present disclosure provides an alternative method and an alternative apparatus for identifying substances in and/or on a material.

Embodiments of the present disclosure achieve the above aims with an apparatus for identifying one or more substances in a material—in particular, wherein the material is present in granulate form—comprising at least one light source—preferably, in the form of a laser for irradiating a sample of the material with light of at least one wavelength, a detector for detecting the light re-emitted by the sample and/or transmitted through the sample, and an analysis device for the spectroscopic analysis of the detected light, characterized in that the analysis device interacts with the detector, and these are embodied in such a way for analyzing the detected light by way of:
 a) UV/VIS spectroscopy, and/or
 b) fluorescence spectroscopy, and/or
 c) Raman spectroscopy, and/or
 d) absorption spectroscopy, and
for creating a first identification result for at least one substance of the sample and, in the case of an ambiguous first identification result, creating a second identification result for the at least one substance on the basis of a
 e) fluorescence light decay time analysis, "FLZA,"
wherein the at least one substance is then at least partly identified on the basis of the first identification result or on the basis of the first and second identification results.

The present disclosure also achieves the above aims with a method for identifying one or more substances in a material—in particular, wherein the material is present in granulate form—wherein, with at least one light source—preferably, in the form of a laser—a sample of the material is irradiated with light of at least one wavelength and, by way of a detector, the light re-emitted by the sample of the material and/or transmitted by the sample is detected, and the detected light is spectroscopically analyzed by an analysis device, characterized in that, by way of:
 a) UV/VIS spectroscopy, and/or
 b) fluorescence spectroscopy, and/or
 c) Raman spectroscopy, and/or
 d) absorption spectroscopy,
the detected light is analyzed, and a first identification result is created for at least one substance of the sample, wherein, in the case of an uncertain first identification result, a second identification result is created for the at least one substance on the basis of a
 e) fluorescence light decay time analysis, "FLZA,"
and wherein the at least one substance is then at least partly identified on the basis of the first identification result or on the basis of the first and second identification results.

In addition, the above aims are achieved by using the fluorescence light decay time to examine—in particular, only with respect to plausibility—a substance, at least partly identified by UV/VIS spectroscopy and/or fluorescence spectroscopy and/or Raman spectroscopy, of a material. In other words, the identified substances can be examined here through the quantitative use of fluorescence light decay time—in particular, with respect to plausibility.

One of the advantages achieved is that a very high level of identification reliability is enabled. An additional advantage is that a simple implementation—in particular, a modular implementation—with reliable evaluation, and thus reliable identification, is enabled. An additional advantage is that chemically similar substances and/or their additives can be reliably distinguished and identified. An additional advantage is that even non-plastics such as rubber, wood, or similar materials can be identified and, where necessary, separated. Moreover, an advantage is that flame retardants in particular, which are added as additives (for example, plastics), can be reliably identified.

In other words, the apparatus and the method enable the identification of substances, their additives, and/or their properties, such as color, etc. It is thereby also possible to determine only the additive or additives, or only the type of substance or only the color of the substance. In particular, it is thereby also possible to determine both the substances and the partly dissolved additives present in the substances, along with the respective color.

The term "substance" is to be understood—in particular, in the claims, and, preferably, in the description—as any type of solid, liquid, or gaseous substance. In particular instances, the term "substance" means any type of polymer or polymers, for example:
 any type of silicone or silicone polymer—in particular, silicone Tectosil granulate, silicone Tectosil film, silicone dehesive Sn, silicone dehesive Pt, any type of silicone tubing, etc.,
 any type of polyethylene (PE), such as LDPE, HDPE, and UHDPE,
 polymethylmetacrylate (PMMA),
 polystyrene (PS),
 polyvinyl chloride and its derivatives,
 polycarbonate (PC), and
 polyethylene terephthalate (PET).

The term, "additive," is to be understood—in particular, in the claims, and, preferably, in the description—as any intentional or unintentional addition to a substance or substances—in particular, flame retardants—preferably, halogenated—in particular, brominated and/or chlorinated flame retardants—for example, comprising:
 polybrominated diphenyl ether (PDBE),
 polybrominated biphenyl (PBB),
 decabrominated diphenyl ether,
 pentabrominated diphenyl ether,
 octabrominated diphenyl ether,
 hexabromocyclododecane,
 tetrabromobisphenol A (TBBP-A),
 tetrabromophthalic anhydride,
 brominated polystyrene,
 brominated phenols,
 reactive flame retardants,
 antimony trioxide,
 antimony pentoxide,
 ammonium sulfate,
 etc.

The term "measurement signal" is to be understood—in particular, in the claims, and, preferably, in the description—as a variable that has been detected, e.g., by way of a sensor, and which the sensor may provide—possibly in another form—for forwarding or further processing. The term "measurement signal" is understood as both the unchanged signal received directly from the sensor ("raw signal"), and a modified, further processed and/or prepared signal.

In particular, the term "sample" is to be understood—in particular, in the claims, and, preferably, in the description—as the entirety of the material to be examined, e.g., plastic, in the form of bottles, flakes, granulate, etc., and, where necessary, with existing additives.

The term "fluorescence decay time" is understood—in particular, in the claims, and, preferably, in the description—also as the terms "fluorescence lifespan," "fluorescence lifespan constant," "fluorescence decay time constant," or the like.

The terms "mono," "bi," "tri," etc., in relation to an exponential function, are understood—in particular in the claims, and, preferably, in the description—in general, as a summation or chronological sequence of different exponential functions with different parameters, wherein the terms "mono," "bi," "tri," etc., denote the respective number of different exponential functions to be added.

The term "mono-exponential" is understood—in particular, in the claims, and, preferably, in the description—in general, as, for example, a function f of the form $$f = a_0 + a_1 \exp(t^*x + b) \text{ with } a_0, a_1, x, t, b \in R.$$

The terms "multiple-exponential," "multi-exponential," or "higher-exponential," are understood—in particular, in the claims, and, preferably, in the description—as "bi-exponential" and/or "tri-exponential," etc.

The term "bi-exponential" is understood—in particular, in the claims, and, preferably, in the description—in general, as, for example, a function f of the form $$f = a_0 + a_1 \exp(t_1 * x + b_1) + a_2 \exp(t_2 * x + b_2)$$

with $a_0, a_1, x, t_1, b_1, t_2, b_2, a_2 \in R$.

The term "tri-exponential" is understood—in particular, in the claims, and, preferably, in the description—in general, as, for example, a function f of the form $$f = a_0 + a_1 \exp(t_1 * x + b_1) + a_2 \exp(t_2 * x + b_2) + a_3 \exp(t_3 * x + b_3)$$

with $a_0, a_1, x, t_1, b_1, t_2, b_2, a_2, t_3, b_3, a_3 \in R$.

The term "partly" in relation to the identification of a substance, means, in particular, that, for example, only the type of substance, but not its exact chemical formula, is determined. For example, a partial identification of a substance is "plastic," but not "PE" or "PVC."

Other preferred embodiments, advantages, and features of the disclosure arise from or are revealed by the following:

Expediently, the at least one light source is designed to emit at least two wavelengths. This allows the sample to be irradiated with different wavelengths, which not only increases the number of possible substances to be identified, but also enables a more accurate identification, based upon the first and second identification results.

Advantageously, the at least two wavelengths can be generated based upon a fundamental frequency and its frequency doubling and/or its frequency tripling and/or quadrupling. By way of such wavelengths, a material sample can, for example, be irradiated with UV light and visual light such that a more accurate first identification result can then be obtained from these two wavelengths, and/or a more accurate identification of the substance(s) and, where appropriate, their additive(s) can be enabled on the basis of the first and second identification results. In addition, a frequency multiplication (i.e., each multiplication of a frequency by an integer) can be used to generate the at least two wavelengths.

Expediently, at least one of the at least two wavelengths is in the range between 233 nm and 300 nm—in particular, between 250 nm and 280 nm, and, preferably, 266 nm—wherein the at least one other wavelength is the corresponding wavelength doubling of the one wavelength. In this manner, extremely reliable identification results can be obtained in an efficient manner. With a YAG laser, they can be at least two wavelengths—for example, the wavelengths of 1,064 nm, 532 nm, 354 nm, and/or 266 nm.

Advantageously, the sample can be irradiated in a first direction, and the re-emitted and/or transmitted light is detectable in a second direction, wherein the first direction and the second direction are different, and in some cases, essentially opposite. In this manner, a particularly compact design of the apparatus as a whole is enabled. If the sample is transparent for the relevant wavelength(s), absorption or transmission can be measured, alternatively or additionally.

Expediently, the first identification result can be examined for plausibility by way of an analysis device, on the basis of the second identification result determined by way of the FLZA. This enables a particularly reliable identification of the substance or substances and, where appropriate, of the additives.

Expediently, the at least one light source is a pulsed light source with pulse durations of more than 1 ns and less than 1 ms—preferably, of more than 1 ns and less than 100 ns, in particular, more than 1 ns and less than 10 ns, and, preferably, between 5 ns and 10 ns. Thus, for one thing, a repeated measurement of the substance for its identification can, for example, also take place, such that multiple excitations (i.e., irradiations) and multiple detections, one behind the other, are enabled. In particular, with an extremely short irradiation time, the measurement of the fluorescence lifespan is not influenced, or influenced only to a very small extent.

Expediently, the pulse duration of the at least one light source is adapted to the time detection of the re-emitted and/or transmitted light in such a manner that the distance between the light pulses essentially corresponds to the detection time of the re-emitted and/or transmitted light by the detector. This allows multiple measurements to be carried out in succession in an extremely efficient manner, such that, altogether, the substance can be identified in a particularly reliable manner.

Advantageously, the re-emitted and/or transmitted light can be detected in the nanosecond range by way of the detector. This enables the detector to record the light with a high temporal resolution.

Expediently, a transport device is arranged for feeding and discharging the sample. Thereby, the sample can be fed to an identification in a simple manner.

Advantageously, the detector is designed to divide a recorded spectrum into relevant and non-relevant areas for later analysis, to discard the non-relevant areas, and to insert FLZA-relevant data into the spectrum in place of the non-relevant areas. In this manner, the memory space and the computing time during the analysis can be reduced. For example, the spectrum can be represented or stored by 32 or 64 individual values in a memory of a storage device. If the start and end values are irrelevant, e.g., the 64th value, the determined fluorescence decay time is stored in place of such value. In this manner, memory space is saved.

Advantageously, by way of the FLZA, the multi-exponential fluorescence decay time constants can be determined and analyzed—in particular, analyzed in a multi-exponential manner. Taking into account bi-exponential or tri-exponential fluorescence decay time constants, for example, it is possible to detect the plastic and/or its additive or additives, for example, more easily and reliably. In addition, even special batches such as silicone dehesives or special processing forms can be reliably identified, for example. With PET drinking bottles, for example, by way of bi-, tri-, and higher-exponential fluorescence decay time constants, the plastic contaminated with oils or other lipophilic substances, such as gasoline, diesel fuel, and lubricating oils as additives, along with the plastic's additive(s), can also be reliably identified. The same applies to silicones and their additive(s).

Expediently, a measuring signal of the detected light, output by way of the detector, is integrated and, in particular, averaged by the analysis device over at least a certain period of time, in order to determine the fluorescence decay time constant. By using integral measurements, the electronic effort for the detection and analysis equipment can be further reduced. In addition, a reliable determination of the fluorescence decay time constant is possible.

Advantageously, the measurement signal is integrated over several—in particular, non-overlapping—time periods by way of the analysis device. This significantly increases the reliability of the determination of the fluorescence decay time constants.

Expediently, the two time spans are the same in terms of duration and different in terms of limits. This allows the time intervals for the FLZA to be made available in a simple and reliable manner.

Advantageously, the analysis device is connectible or connected to a storage device, wherein the analysis device comprises at least one integrator, wherein the measurement signal is integrated separately by way of the at least one integrator over two non-overlapping time spans, and wherein the values for the integrated signals are brought into relation with one another and, on the basis of this relation, the at least one substance can be identified on the basis of reference relation values stored in the storage device. Here, "relation" is to be understood particularly in the mathematical sense, and can exist, in particular, through a quotient calculation of the two measured integrated components of the fluorescence decay time constant. The quotient thus obtained can be used, for example, to compare it with reference quotients correspondingly stored in the storage device, and thus determine a substance and/or its additives.

Advantageously, at least one time span corresponds to a falling edge of the measurement signal. This allows a range for determining the fluorescence decay time constant to be specified in a simple and at the same time reliable manner—specifically, on the falling edge of the measured signal plotted over time.

Advantageously, with the FLZA, the position of at least one time span prior to and/or after a normal half-life of a fluorescence lifespan can be selected. This allows the signal-to-noise ratio to be significantly improved, since the re-emitted and/or transmitted light of the measured sample can be used more effectively or efficiently.

Advantageously, the fluorescence decay time constant of the at least one substance to be detected is roughly known or determinable, and the duration of the light pulses can be selected to be smaller than the roughly known fluorescence decay time constant—in particular, at least by a factor of 5, and, preferably, at least by a factor of 10. This makes it possible to determine the fluorescence decay time constant in a particularly reliable manner on the basis of the re-emitted and/or transmitted light, since the excited light pulse essentially does not interfere with the measurement of the re-emitted and/or transmitted light. The duration of the light pulses can be less than 1 ms—preferably less than 100 ns, in particular, less than 10 ns, and, preferably, between 5 ns and 10 ns. This allows the duration of the excitation pulse to be selected to be considerably shorter than the fluorescence lifespan. Such light pulses can, for example, be generated efficiently with semiconductor lasers.

Advantageously, a sorting apparatus is arranged for separating identified substances from a material stream of substances. This makes it possible to separate contaminated plastics, for example, in a simple and reliable manner.

Advantageously, an optical grating is arranged in a detection beam path of the re-emitted and/or transmitted light, and the light diffracted by the optical grating in zero or first order is used for the FLZA—in particular, for determining the fluorescence decay time constants. In addition to the determination of the fluorescence decay time constant, additional identification methods can also be carried out in a simple manner by way of, for example, light in a higher order. If, for example, the light is used in zero order for the FLZA, for example, the light can be directed in first order around the beam path for optical spectroscopy, e.g., to an array made of 32 photomultipliers for detection, since this does not then block its light path or beam path through a corresponding detector for the FLZA.

Expediently, the sample can be irradiated several times in succession with light of at least one wavelength, and the corresponding re-emitted and/or transmitted light can be measured and analyzed several times. This further increases reliability—in particular, in the determination of the fluorescence lifespan constant—since various measurements can serve as a basis for spectroscopic analysis and for the FLZA.

Advantageously, the at least two time spans can be assigned to temporally different—in particular, successive—irradiations of the sample with light. One of the advantages achieved is that the requirements for the electronic components for the evaluation are reduced even further, since it is excited and measured in different cycles of excitation and measurement. Thus, it is irradiated and measured at different times.

Expediently, the detection of re-emitted and/or transmitted light by way of the detector can be triggered by irradiating the sample with light. Thereby, a time-shifted measurement triggered by the excitation light pulse can be undertaken, such that a measurement within a fluorescence decay process—in particular, with periodic excitation—is enabled. Other important features and advantages of the disclosure result from the dependent claims, from the drawings, and from the associated description, with reference to the drawings.

It goes without saying that the features mentioned above and the features yet to be explained below can be used not only in the respectively specified combinations, but also in other combinations or alone, without departing from the scope of the present disclosure.

BRIEF DESCRIPTION OF THE SEVERAL VIEWS OF THE DRAWINGS

Preferred designs and embodiments of the disclosure are shown in the drawings and are explained in more detail in the following description, wherein like reference numerals refer to like or similar or functionally similar components or elements. The following is shown.

DETAILED DESCRIPTION

Figure 1:
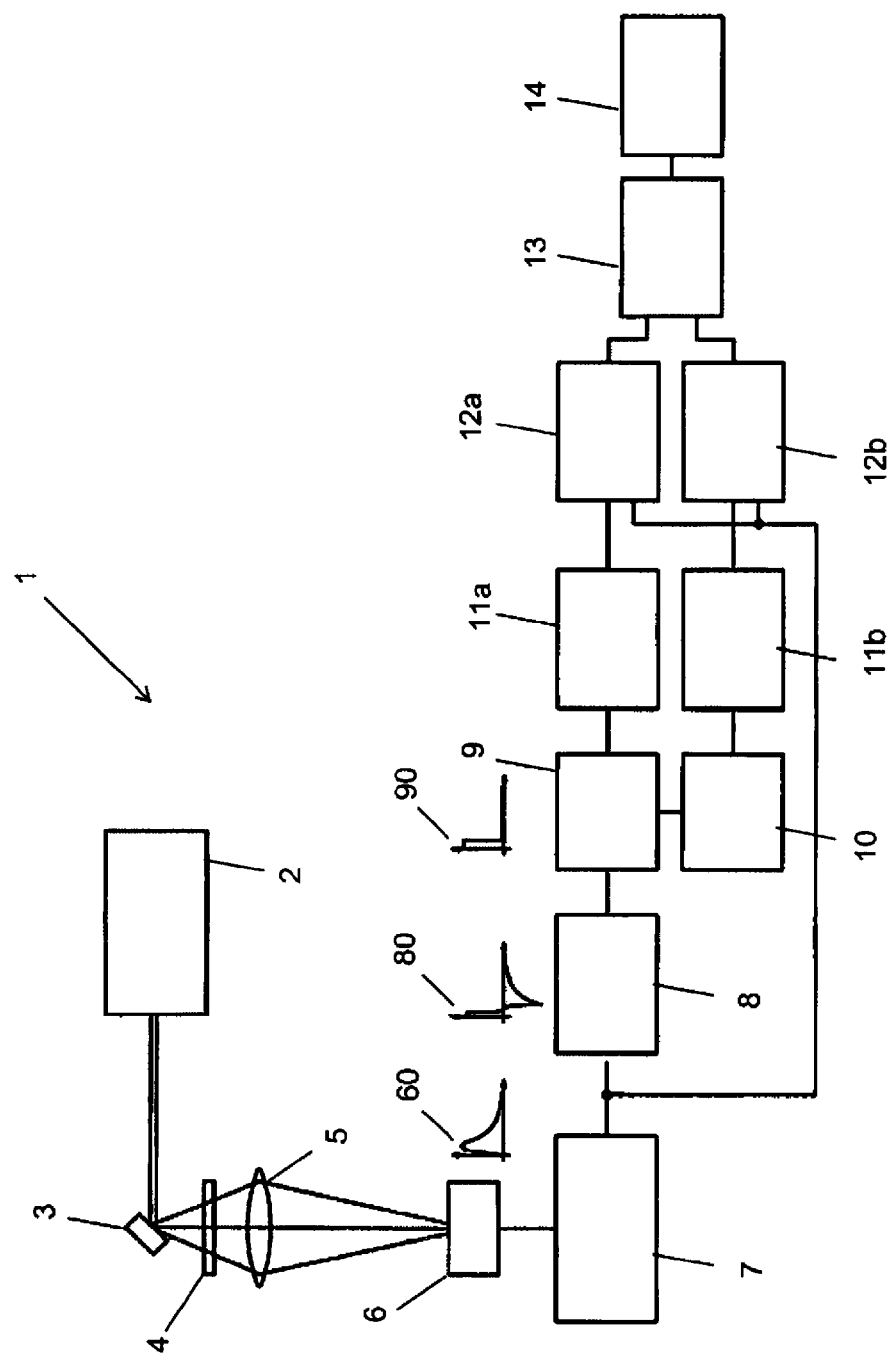
FIG. 1 is a schematic illustration of an apparatus according to one or more embodiments of the present disclosure.
Figure 2:
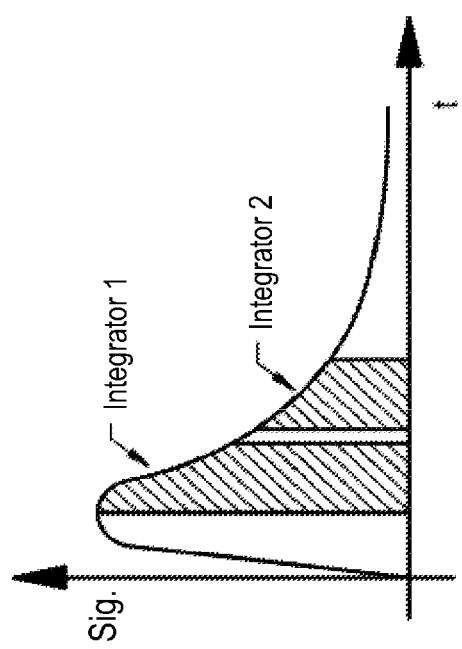
FIG. 2 is a graph schematically illustrating integration of a detected signal according to one or more embodiments of the present disclosure.

FIG. 1 shows, in schematic form, an apparatus according to one embodiment of the present disclosure, and FIG. 2 shows, in schematic form, parts of a method according to one embodiment of the present disclosure.

The reference signs in FIG. 1 are described as follows: apparatus 1, pulse light source 2, sample 3, filter 4, lens 5, sensor 6, signal processor 7, differentiator 8, trigger generator 9, delay 10, timer integrator 11a, 11b, integrator 12a, 12b, quotient calculator 13, evaluator 14, raw signal 60, differentiated signal 80, and trigger signal 90. An analysis device, as referred to herein, may include one or more of the signal processor 7, differentiator 8, trigger generator 9, delay 10, timer integrator 11a, 11b, integrator 12a, 12b, quotient calculator 13, and evaluator 14.

FIG. 1 shows an apparatus for identifying one or more substances in a material, such as plastic and/or, where appropriate, one or more of its additives. The apparatus 1 thereby comprises a pulse light source 2—here in the form of a laser—with which a sample 3 of the plastic to be identified is irradiated. The light re-emitted and/or transmitted by the sample 3 is detected by a filter 4, along with a lens 5, using a sensor 6. The raw signal received from sensor 6 is processed by way of a signal processor 7, and a differentiated signal is likewise generated by a differentiator 8. A trigger is also generated by way of a trigger generator 9, which then triggers a first timing element integrator 12a and, via a delay 10, a second timing element integrator 12b.

By way of the two integrators 12a and 12b, the signal (see FIG. 2) is integrated for different, non-overlapping time spans of equal duration on the falling edge of the processed signal. The two values, which are provided by the two integrators 12a and 12b, are set in relation to each other by way of a quotient calculator 13—here, by way of the formation of a quotient—and the number thus obtained is fed to an evaluator 14.

The evaluator 14 may consist in, among other things, storing a large number of reference key figures for various combinations of plastics and their additives in a memory of the apparatus, and then identifying the plastic and/or its additives on the basis of a comparison between such key figures and the key figure determined by the measurement. For the storage of such values/key figures, multiple repeated measurements of the same plastic with the same additives can, for example, be carried out, and such measurements can then be stored in the memory with, for example, an average value and a corresponding deviation. In the case of an identification that is ambiguous, such a result can be displayed to a user and, if the method is used for recycling, the plastic can be separately sorted out and then, if necessary, sent to another identification method. Using modern, ultra-fast, analog-to-digital converters, in an additional embodiment of FIG. 1, a digitization of the measured values of sensor 6 directly behind or after the sensor can occur, such that the subsequent evaluation can be carried out flexibly, i.e., digitally, with that application specific to the problem, by way of software.

Figure 3:
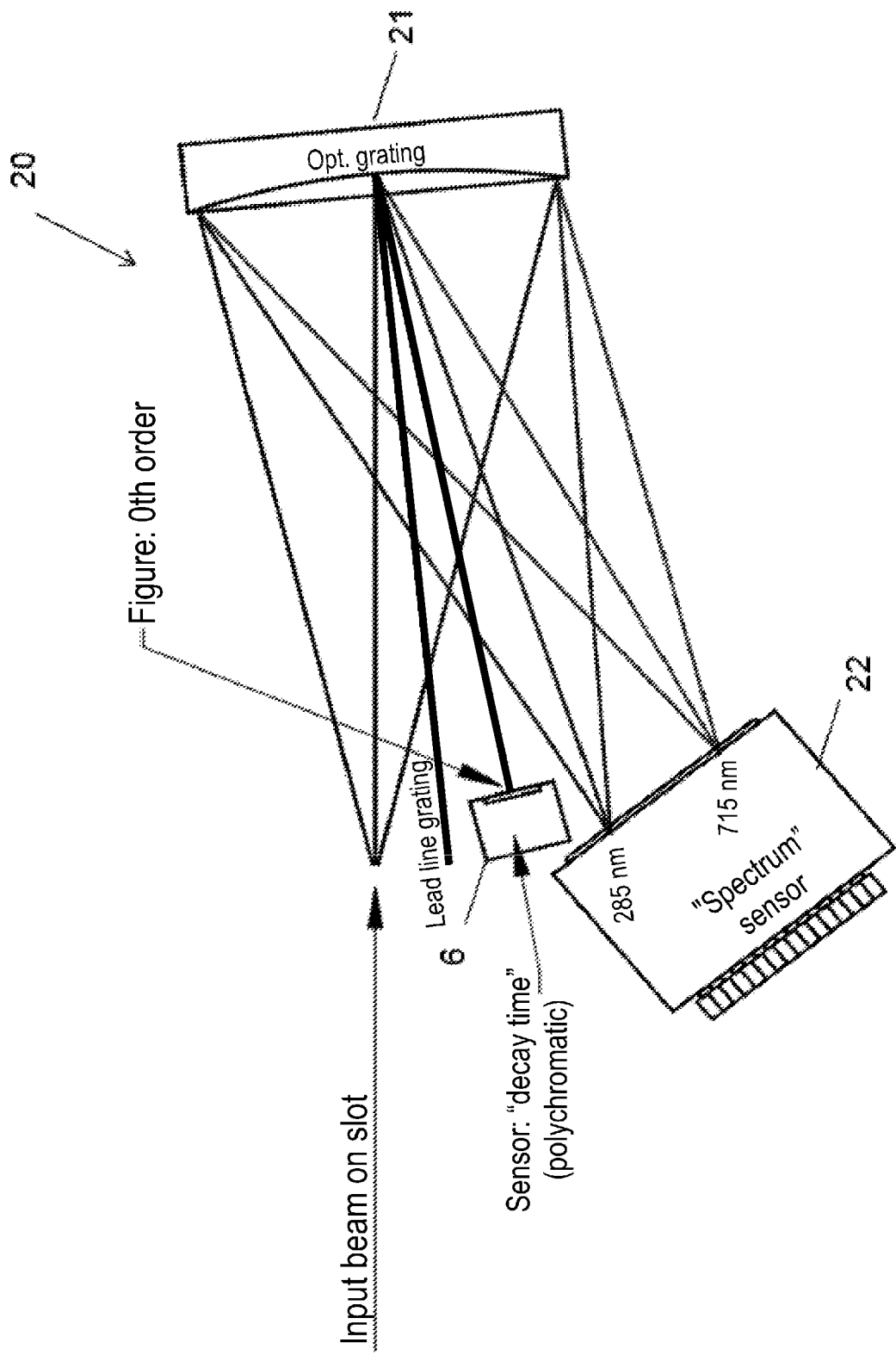
FIG. 3 is a schematic illustration of parts of an apparatus according to one or more embodiments of the present disclosure.

FIG. 3 shows, in schematic form, parts of an apparatus according to one embodiment of the present disclosure.

FIG. 3 shows a spectrometer with an additive for measuring the fluorescence decay time. In the detection beam path—in particular, between lens 5, sensor 6, and sensor system 22 in FIG. 1—an optical grating 21 is additionally arranged; this diffracts the light bundled by the lens 5. The sensor 6, which is intended for the re-emitted and/or transmitted light for detecting the fluorescence decay time constant, is arranged in the 0th order of the light diffracted by the optical grating 21. Beside this, the sensor system 22, e.g., in the form of a photomultiplier array, is arranged; it serves to receive the higher orders of diffracted light from the optical grating 21. This is here particularly sensitive in the wavelength range between 250 nm and 750 nm—preferably, between 285 nm and 715 nm. Thereby, the light re-emitted and/or transmitted by the plastic and/or its additives can then also be analyzed in this spectral range.

Figure 4:
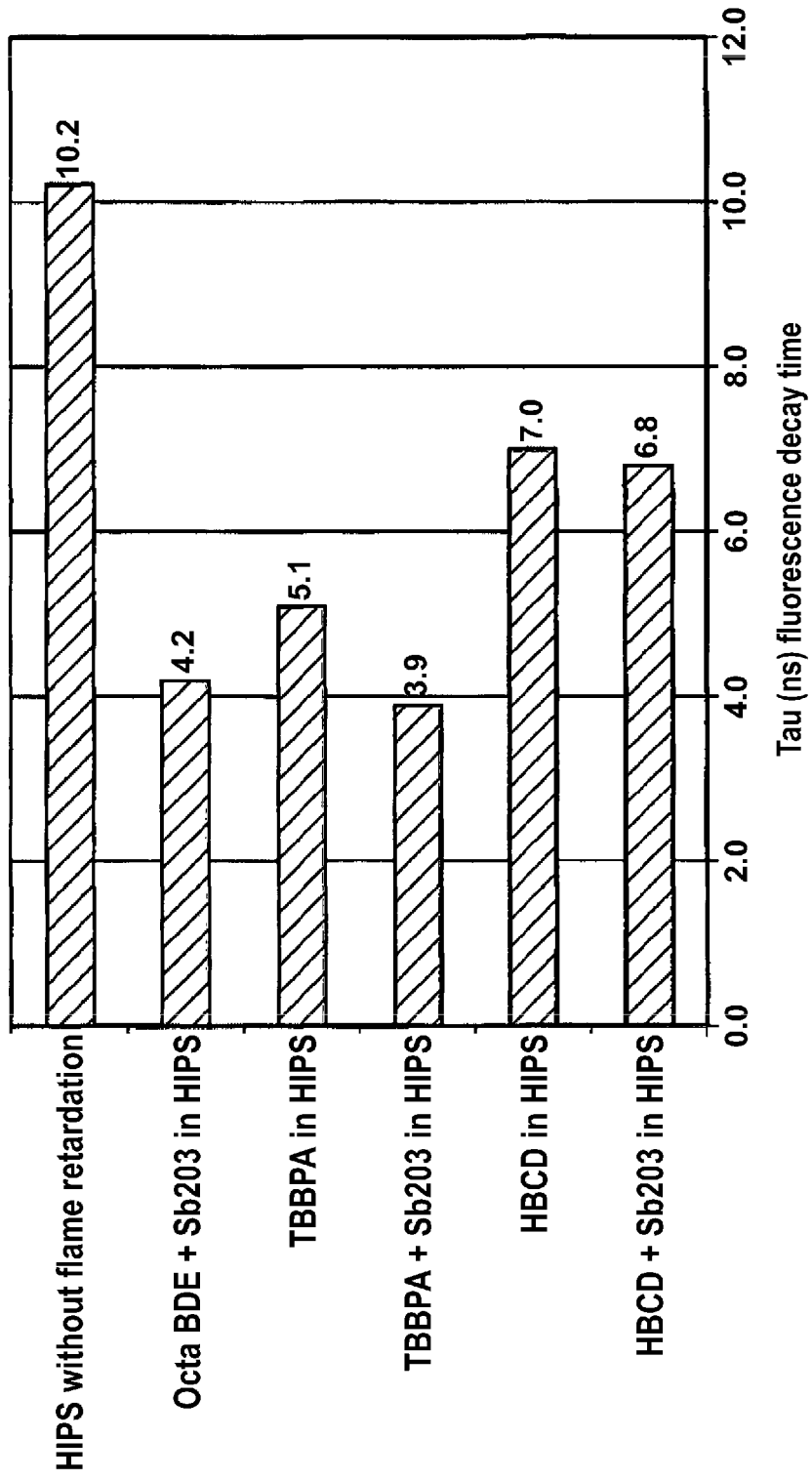
FIG. 4 is a graph illustrating fluorescence decay times for summed fluorescence of polystyrene, without and with different flame retardants.

FIG. 4 shows fluorescence decay times with a summed fluorescence decay time of polystyrene, without and with different flame retardants.

In particular, FIG. 4 shows different fluorescence decay times for a summed fluorescence with an excitation at a wavelength of 266 nm of impact resistant polystyrene, HIPS (high impact polystyrene), without flame retardants and with different flame retardants. The wavelength of 266 nm can be generated, for example, with a Nd: YAG laser, which features a fundamental wavelength of 1,064 nm, by way of frequency multiplication in an already known manner. FIG. 4 shows significant differences in the fluorescence decay time with different flame retardants. For example, the fluorescence decay time amounts to 10.2 ns for HIPS without flame retardancy, wherein, however, with the addition of the TBBPA and $Sb_2O_3$ flame retardants, it is smaller by more than half—specifically, here, 3.9 ns.

As a whole, FIG. 4 shows that the addition of flame retardants in impact resistant polystyrene has significant effects on the duration of the fluorescence decay time and depends upon the flame retardants used. In particular, the decay time is reduced by flame retardants present in the plastic—probably due to quench effects.

Figure 5:
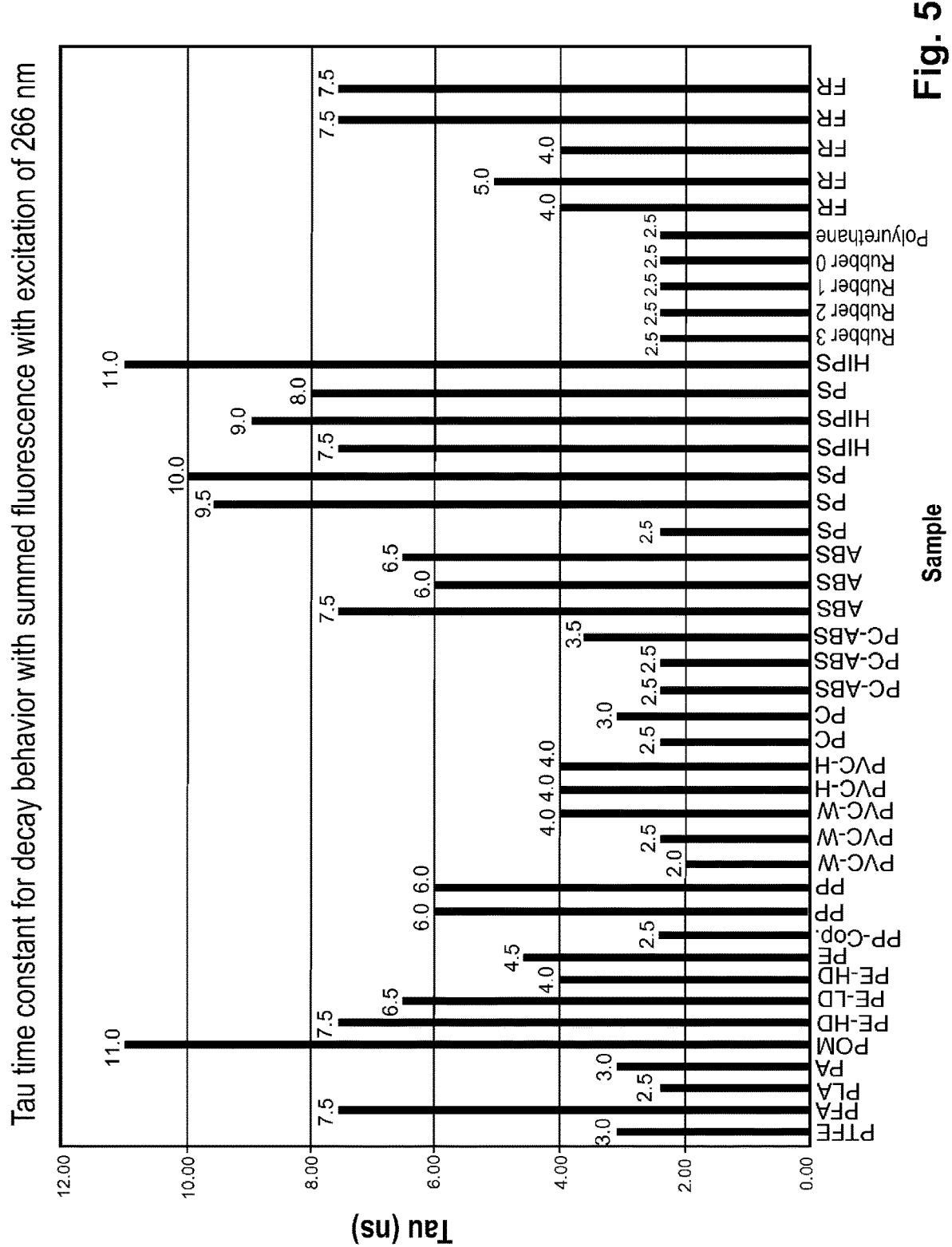
FIG. 5 is a graph illustrating fluorescence decay time constants of different substances, for summed fluorescence.

FIG. 5 shows fluorescence decay time constants of different substances with summed fluorescence.

In particular, FIG. 5 shows the mono-exponential fluorescence decay times t with summed fluorescence for different materials—in particular, plastics—at an excitation wavelength of 266 nm. The following abbreviations are used:

PTFE (polytetrafluoroethylene);
PFA (perfluoroalkoxy polymer);
PLA (polylactic acid/polylactide);
polyamide;
POM (polyoxymethylene);
PE-HD (high density polyethylene);
PE-LD (low density polyethylene);
PP (polypropylene, polypropylene copo);
PVC (polyvinyl chloride (,S: soft; ,H: hard));
PC (polycarbonate (ABS: acrylonitrile butadiene styrene));
PS (polystyrene);
HIPS (high impact polystyrene); and
FR (various flame retardants).

As FIG. 5 shows, rubber and polyurethane always have very short decay times. These are thus particularly well suited, on the whole, for being identified or distinguished from other plastics—also due to the possibly weak spectral information of such substances. HIPS and PS have a very long decay time, wherein this is reduced by the presence of FR flame retardants—probably due to quench effects: without flame retardants, HIPS features a decay time of approximately 11 ns. This is reduced to 4-7.5 ns due to flame retardants.

PVC shows a very short decay time compared to other plastics. In this respect, the fluorescence decay constant can be used as additional information for identifying PVC. FIG. 5 also shows that pure ABS always features a longer fluorescence decay time constant than PC or ABS mixed with PC. PC alone features a short decay time. In this respect, the decay behavior can be used to separate ABS from PC or PC-ABS. In contrast, POM has the longest decay time of all the substances listed in FIG. 5. The fluorescence decay time constant of POM can be used to uniquely identify POM.

Figure 6:
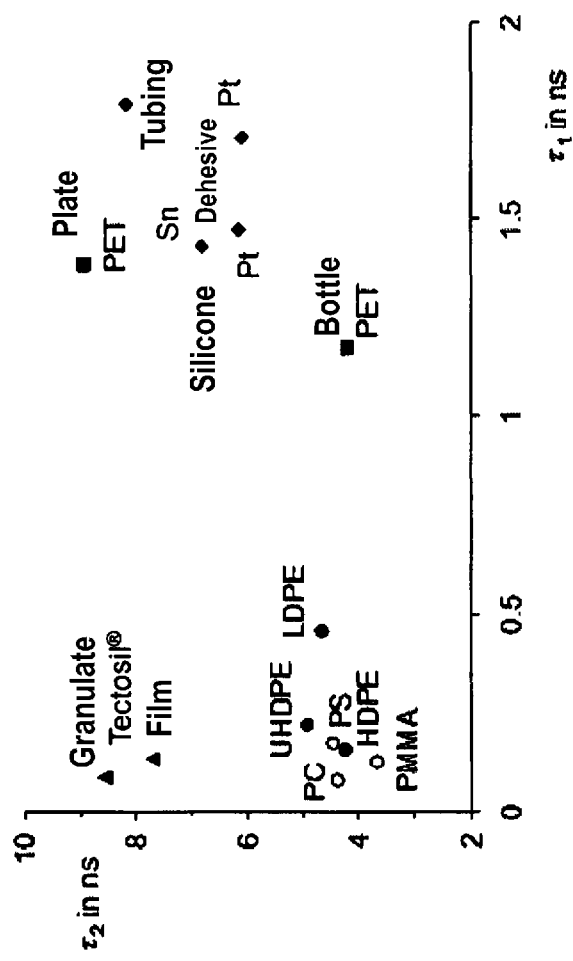
FIG. 6 is a graph illustrating an overview of a bi-exponential evaluation of fluorescence decay times of different materials.

FIG. 6 shows an overview of a bi-exponential evaluation of fluorescence decay times of different materials.

In particular, FIG. 6 reproduces the bi-exponential decay times of different plastic materials. In principle, however, a mono-exponential decay time determination can also already be sufficient for certain plastics:

TABLE 1

| Plastic material | T | $T_1$ | $T_2$ | No. |
|---|---|---|---|---|
| Polymethyl methacrylate (PMMA) | 0.841 | 0.124 | 3.669 | 1 |
| Polystyrene (PS) | 3.290 | 0.171 | 4.457 | 2 |
| Polycarbonate (PC) | 1.038 | 0.077 | 4.379 | 3 |
| Polyethylene terephthalate (PET) bottle[a] | 1.840 | 1.176 | 4.205 | 4 |
| Polyethylene terephthalate (PET) plate | 4.466 | 1.387 | 8.933 | 5 |
| Polyethylene LDPE | 2.19 | 0.456 | 4.655 | 6 |
| Polyethylene HDPE | <0.2 | 0.155 | 4.238 | 7 |
| Polyethylene UHDPE | 1.58 | 0.217 | 4.932 | 8 |
| Silicone Tectosil ® granulate | | 0.132 | 7.709 | 9 |
| Silicone Tectosil ® film | | 0.084 | 8.572 | 10 |
| Silicone dehesive Sn | 3.078 | 1.432 | 6.825 | 11 |
| Silicone dehesive Pt (1) | 3.162 | 1.473 | 6.149 | 12 |
| Silicone dehesive Pt (2) | 3.114 | 1.707 | 6.106 | 13 |
| Silicone tubing | 4.333 | 1.793 | 8.180 | 14 |

[a]PET beverage bottle of a known manufacturer of lemonade drinks.

Table 1 above shows the fluorescence decay constants τ in ns of various technical polymers averaged over 10 s measurement time. Fluorescence excitation took place at a wavelength of 403 nm, mono-exponential evaluation: t, bi-exponential evaluation: $\tau_1$ and $\tau_2$.

It can be seen from Table 1 that a classification is basically already possible via the mono-exponential decay time t (nos. 1 through 8); for silicones, this is difficult simply due to the partially very short decay time t (nos. 9 through 10). If both decay constants ($\tau_1$ and $\tau_2$) are taken into account, a classification is much simpler and more reliable, and it is possible to assign not only the plastic itself, but also special batches, such as silicone dehesives (nos. 11 through 13) or special processing forms (nos. 4 and 5 and nos. 9 and 10). This can be clearly seen in the two-dimensional application of $\tau_2$ against $\tau_1$, as shown in FIG. 6; clusters are then found, such as, for example, for the various dehesive films. Through such an analysis, together with the time constant t of the mono-exponential evaluation, more difficult classifications can be made—for example, for the various types of polyethylene.

The fluorescence decay times were thereby determined over a period of 10 s by integrating the fluorescence, and resulted in highly reproducible values, even with different plastic samples. The measuring time could also be reduced to 1 ms without any problems, and the measured values were only slightly more scattered.

For fluorescence excitation, the usual light sources for short light flashes can be used, e.g., gas discharge lamps (flash lamps)—preferably with hydrogen-containing gas fillings—or semiconductor lasers, which are available in a variety of forms and can be operated without any complications. The pulse duration can be in the range of nanoseconds, and the temporal progression of the fluorescent light in response to the excitation pulse can be obtained in a known manner—for example, by way of deconvolution. For this purpose, it is not necessary, but advantageous, if the duration of the excitation pulse is considerably shorter than the fluorescence lifespan; this can be achieved efficiently with semiconductor lasers.

The fluorescence lifespan spectra were recorded with a PicoQuant FluoTime 300. The light source was a PC-405 laser, controlled with a PicoQuant PicoHarp 300, with 0.4 mW power at a pulse frequency of 20 MHz and an excitation wavelength of 403 nm.

TABLE 2

Determination of the detection wavelength.

| Sample | $t_{Fluo1}$ | $t_{Fluo2}$ | Selected detection wavelength |
|---|---|---|---|
| PMMA | 2-3 ns | 4-100 ns | 440 nm |
| PS | 4-6 ns | 6-100 ns | 490 nm |
| PC | 2-3 ns | 4-100 ns | 440 nm |
| Tectosil granulate | 2-3 ns | 4-100 ns | 480 nm |
| Tectosil film | 2-3 ns | 4-100 ns | 480 nm |
| PET | 2-5 ns | 8-100 ns | 450 nm |
| PE (HDPE) | 2-3 ns | 4-100 ns | 500 nm |

The detection wavelength was determined by recording a lifespan-dependent fluorescence spectrum. In the process, at the corresponding spectral wavelengths, the respective fluorescence intensities of the fluorescence components with predominantly short ($t_{Fluo1}$) and predominantly long ($t_{Fluo2}$) fluorescence lifespans were recorded. The selected ranges result from the nature of the sample measured and are not necessarily representative of the individual fluorophores contained in the sample. Detection was subsequently performed at the wavelength corresponding to the fluorescence maximum of the components with long fluorescence lifespans (Table 2).

The measurement time of the fluorescence lifespan determination amounted to 1.0 ms or 10 s. The decay curves thus obtained were evaluated with the FluoFit software program from PicoQuant. For this purpose, the maximum of the measurement curve was determined, and considered with respect to two abscissa sections. For one, that between the curve maximum ($t_{max}$) and the corresponding time point x ns after the detected maximum intensity ($t_{xns}$), resulting in the fluorescence lifespan $\tau_1$. The second abscissa section comprises, beginning with $t_{yns}$, a range of 40 ns (up to $t_{zns}$), from which the fluorescence lifespan $\tau_2$ results (Table 3). The fluorescence lifespans are obtained through an exponential tail fit of the respective curve section according to the formula $I_{rel}=A*e^{-t/\tau}$.

TABLE 3

Selection of time ranges as a function of the decay curve for a bi-exponential tail fit.

| Sample | $t_{max}$-$t_{xns}$ | $t_{yns}$-$t_{zns}$ |
|---|---|---|
| PMMA | 0-0.5 ns | 3-43 ns |
| PS | 0-0.5 ns | 3-43 ns |
| PC | 0-0.5 ns | 3-43 ns |
| Tectosil granulate | 0-0.5 ns | 2-42 ns |
| Tectosil film | 0-0.5 ns | 2-42 ns |
| PET | 0-3 ns | 5-45 ns |
| PE | 0-3 ns | 3-43 ns |

The excitation structure of the laser was not taken into account, due to its small half-width. Thus, the values obtained are not absolute, but must be adapted to the specific device. In the case of the remaining silicones (dehesive, tubing), the deconvoluted data were evaluated bi-exponentially for the purpose of better reproducibility. This ensures a higher level of reliability during identification.

In the following, the fluorescence decay time constants of PET drinking bottles are determined—in particular, PET water bottles and their shredder material—in order to distinguish them from PET material contaminated with oils and other lipophilic substances such as gasoline, diesel fuel, and lubricating oils (motor oil). Such contact may have occurred in accordance with the function or also through misuse—for example, the unauthorized filling of fuels in drinking bottles. This resulted in the following fluorescence decay times:

TABLE 4

Fluorescence decay constants T, $T_1$, $T_2$ in ns of PET materials with various impurities averaged over a 10 s measurement duration. Fluorescence excitation at 403 nm, detection at 450 nm. Mono-exponential evaluation: T; bi-exponential evaluation: $T_1$ and $T_2$.

| PET material | T | $T_1$ | $T_2$ | No. |
|---|---|---|---|---|
| Beverage bottle[a] | 1.840 | 1.176 | 4.205 | 1 |
| Recycling flakes[b] | 1.867 | 0.980 | 5.301 | 2 |
| Bottle, contact with diesel[a,c] | 0.971 | 0.937 | 3.479 | 3 |
| Bottle, contact with diesel, washed[a,c,d] | 0.994 | 0.947 | 3.608 | 4 |
| Bottle, contact with motor oil[a,c] | 1.020 | 0.973 | 4.166 | 5 |
| Bottle, contact with motor oil, washed[a,c,d] | 1.060 | 1.028 | 3.662 | 6 |
| PET plate | 4.466 | 1.387 | 8.933 | 7 |

[a] PET beverage bottle of a known manufacturer of lemonade drinks.
[b] commercial PET recycling flakes.
[c] contact with foreign matter after one week.
[d] washed material; see experimental part.

One can see from Table 4 that, for PET standard beverage bottles, decay constants of around 1.8 ns are obtained (τ from nos. 1 and 2), which, surprisingly, become considerably shorter at 1 ns when contaminated with mineral oil products such as diesel oil or motor oil (nos. 3 and 5). Careful washing does little to change this (nos. 4 and 6). One PET plate (no. 7) showed significantly higher fluorescence decay times. If bi-exponential components ($\tau_1$ and $\tau_2$) are taken into account, high values $\tau_1$ for untreated material (nos. 1, 2, and 7) can be found in an analogous manner; these drop significantly when treated with mineral oil products (nos. 3 and 5), and, even after careful washing, no longer reach the original values (nos. 4 and 6), and a completely analogous picture arises for the decay time $\tau_2$ and thus allows a classification on the basis of two sizes. The shortening of the mono-exponential decay constant τ of contaminated material is partly due to the fact that the long-lived, bi-exponential component, characterized by $\tau_2$, turns out to be significantly smaller.

Here, the fluorescence decay times were determined over a period of 10 s by integrating the fluorescence, and resulted in highly reproducible values, even with different samples. The measuring time could be reduced to 1 ms without any problems, and the measured values were only slightly more scattered.

The detection wavelength was determined by recording a lifespan-dependent fluorescence spectrum from a PET derivative. In the process, at the corresponding spectral wavelengths, the respective fluorescence intensities of the fluorescence components with predominantly short ($t_{Fluo1}$=2-5 ns) and predominantly long ($t_{Fluo2}$=8-100 ns) fluorescence lifespans were recorded. The selected ranges result from the nature of the sample measured and are not necessarily representative of the individual fluorophores contained in the sample. Detection was subsequently performed at the wavelength corresponding to the fluorescence maximum of the components with long fluorescence lifespans (450 nm).

The measurement time of the fluorescence lifespan determination amounted to 1.0 ms or 10 s. The decay curves thus obtained were evaluated with the FluoFit software program from PicoQuant. For this purpose, the maximum of the measurement curve was determined, and considered with respect to two abscissa sections. For one, that between the curve maximum ($t_{max}$) and the corresponding time point 3.0 ns after the detected maximum intensity ($t_{3ns}$), resulting in the fluorescence lifespan $\tau_1$. The second abscissa section comprises, beginning with an abscissa section 5 ns behind the maximum ($t_{5ns}$), a range of 40 ns (up to $t_{45ns}$), from which the fluorescence lifespan $\tau_2$ results. The fluorescence lifespans are obtained through an exponential tail fit of the respective curve sections according to the formula $I_{rel}=A*e^{-t/\tau}$.

The excitation structure of the laser was not taken into account, due to its small half-width. Thus, the values obtained are not absolute, but must be adapted to the specific device. However, the described method explains the reliable differentiation of the different samples, and can be adapted to other experimental arrangements.

Cleaning was initially carried out by manual wiping with cloth cloths; compact PET parts were shredded into flakes. The PET flakes were then washed in a mixture composed of a 3% aqueous NaOH solution (100 mL) and a 15% aqueous sodium dodecyl sulfate solution (50 mL) at 85° C. for 2 h while stirring. Finally, the test specimens were dried with cloth paper, air pressure, and then for 16 h at 60° C.

Mono- and bi-exponential fluorescence decay times were also determined for polyethylene:

For LDPE (high pressure polyethylene), the longest fluorescence decay time of 2.19 ns was found for mono-exponential application, which differs so significantly from the decay time of other polyethylene species that easy detection is clearly possible. The fluorescence decay times of the low-pressure polyethylene types, HDPE and UHDPE, are considerably shorter. However, a distinction is also possible here, and, for UHDPE, 1.58 ns is found, and finally, for HDPE, the shortest decay time of less than 0.2 ns is found; for the latter material, a further supporting process may be desirable due to the very short decay time. The fluorescence decay curves of polyethylenes contain high bi-exponential components, and a bi-exponential evaluation of the curves shows 0.456 ns and 4.655 ns for LDPE, 0.155 ns and 4.238 ns for HDPE, and 0.217 ns and 4.923 ns for UHPE; see Table 5 below. Using the bi-exponential components, the classification of polyethylenes is considerably simplified and significantly more reliable.

TABLE 5

Fluorescence decay constants T in ns of various PE materials averaged over a 10 s measurement duration. Fluorescence excitation at 403 nm, detection at 450 nm. Mono-exponential evaluation: T, bi-exponential evaluation: $T_1$ and $T_2$. The standard deviation is given in parentheses, with an unfavorable integration time of 1 ms and 10 independent material samples.

| PE material | T | $T_1$ | $T_2$ | No. |
|---|---|---|---|---|
| LDPE | 2.19 | 0.456 (±0.039) | 4.655 (±0.93) | 1 |
| HDPE | <0.2 | 0.155 (±0.013) | 4.238 (±0.77) | 2 |
| UHDPE | 1.58 | 0.217 (±0.022) | 4.923 (±0.91) | 3 |

The values $\tau_1$ and $\tau_2$ in Table 5 have been determined at an integration time of 10 s and are to be regarded as reliable mean values. To estimate the effect of measurement errors, the standard deviations for the less favorable integration time of only 1 ms were determined from the measurements of 10 independent samples. Even considering the now unfavorable boundary conditions, a clear identification of the polymer materials is possible.

The detection wavelength for PE was here determined by recording a lifespan-dependent fluorescence spectrum of a PE derivative (HDPE). In the process, at the corresponding spectral wavelengths, the respective fluorescence intensities of the fluorescence components with predominantly short ($t_{Fluo1}$=2-3 ns) and predominantly long ($t_{Fluo2}$=4-100 ns) fluorescence lifespans were recorded. The selected ranges result from the nature of the sample measured and are not necessarily representative of the individual fluorophores contained in the sample. Detection was subsequently performed at the wavelength corresponding to the fluorescence maximum of the components with long fluorescence lifespans (500 nm).

The measurement time of the fluorescence lifespan determination again amounted to 1.0 ms or 10 s. The decay curves thus obtained were evaluated with the FluoFit software program from PicoQuant. For this purpose, the maximum of the measurement curve was determined, and considered with respect to two abscissa sections. For one, that between the curve maximum ($t_{max}$) and the corresponding time point 3.0 ns after the detected maximum intensity ($t_{3ns}$), resulting in the fluorescence lifespan $\tau_1$. The second abscissa section comprises, beginning with $t_{3ns}$, a range of 40 ns (up to $t_{43ns}$), from which the fluorescence lifespan $\tau_2$ results. The fluorescence lifespans are obtained through an exponential tail fit of the respective curve sections according to the formula $$I_{rel}=A*e^{-t/\tau}.$$

The excitation structure of the laser was again not taken into account, due to its small half-width. Thus, the values obtained are not absolute, but must be adapted to the specific device. However, the described method explains the reliable differentiation of the different samples, and can be adapted to other experimental arrangements.

In addition, mono- and bi-exponential fluorescence decay times were also determined for various silicone materials.

TABLE 6

Fluorescence decay constants T in ns of various silicone materials averaged over a 10 s measurement duration. Fluorescence excitation at 403 nm, detection at 450 nm. Bi-exponential evaluation: $T_1$ and $T_2$.

| Silicone material | T | $T_1$ | $T_2$ | No. |
|---|---|---|---|---|
| Tectosil ® granulate |  | 0.132 | 7.709 | 1 |
| Tectosil ® film |  | 0.084 | 8.572 | 2 |
| Silicone dehesive Sn | 3.078 | 1.432 | 6.825 | 3 |
| Silicone dehesive Pt (1) | 3.162 | 1.473 | 6.149 | 4 |
| Silicone dehesive Pt (2) | 3.114 | 1.707 | 6.106 | 5 |
| Silicone tubing | 4.333 | 1.793 | 8.180 | 6 |

One can see from Table 6 that the silicones can be clearly classified via the two decay constants ($\tau_1$ and $\tau_2$). Two clusters are obtained by obtaining, for the commercial silicone elastomer Tectosil® (nos. 1 and 2), short decay constants $\tau_1$, and longer decay constants for dehesive materials (nos. 3 through 5). The processing of Tectosil® has a smaller, but characteristic influence (nos. 1 and 2). The decay constants $\tau_2$ are very long compared to other polymers and can be used for the allocation to silicones, and also for fine allocation. This size also makes it possible to distinguish the manufacturing of dehesive materials, by finding a longer constant for tin catalysts (no. 3) and a shorter constant for platinum catalysts (nos. 4 and 5). In its data, a commercially available silicone tubing (no. 6) corresponds more to the dehesive materials, but can be clearly distinguished from these; materials of various manufacturers and for various purposes of use can be efficiently distinguished and classified. FIG. 5 shows this in two dimensions.

The fluorescence decay times were determined over a period of 10 s by integrating the fluorescence, and resulted in highly reproducible values, even with different samples. The measuring time could be reduced to 1 ms without any problems, and the measured values were only slightly more scattered.

The fluorescence lifespan spectra were recorded with a PicoQuant FluoTime 300. The light source was a PC-405 laser, controlled with a PicoQuant PicoHarp 300, with 0.4 mW power at a pulse frequency of 20 MHz and an excitation wavelength of 403 nm.

The detection wavelength was determined by recording a lifespan-dependent fluorescence spectrum of Tectosil (granulate). In the process, at the corresponding spectral wavelengths, the respective fluorescence intensities of the fluorescence components with predominantly short ($t_{Fluo1}$=2-3 ns), and predominantly long ($t_{Fluo2}$=4-100 ns) fluorescence lifespans were recorded. The selected ranges result from the nature of the sample measured and are not necessarily representative of the individual fluorophores contained in the sample. Detection was subsequently performed at the wavelength corresponding to the fluorescence maximum of the components with long fluorescence lifespans (480 nm).

The measurement time of the fluorescence lifespan determination amounted to 1.0 ms or 10 s. The decay curves thus obtained were evaluated with the FluoFit software program from PicoQuant. For Tectosil, the maximum of the measurement curve was determined, and considered with respect to two abscissa sections. For one, that between the curve maximum ($t_{max}$) and the corresponding time point 0.5 ns after the detected maximum intensity ($t_{0.5ns}$), resulting in the fluorescence lifespan $\tau_1$. The second abscissa section comprises, beginning with an abscissa section 2 ns behind the maximum ($t_{2ns}$), a range of 40 ns (up to $t_{42ns}$), from which the fluorescence lifespan $\tau_2$ results. The fluorescence lifespans are obtained through an exponential tail fit of the respective curve sections according to the formula $I_{rel}=A*e^{-t/\tau}$. In the case of the remaining silicones, the deconvoluted data was evaluated bi-exponentially for better reproducibility. This ensures a higher sorting reliability.

In general, the detection of polymers via the fluorescence decay constant can be used to sort materials for recycling—for example, thermoplastics, where reuse can be done easily. In addition, it is also advantageously applicable to plastics that are to be chemically processed, e.g., when using consumed Thermodurs, since it is then possible to feed the processes with a uniform starting material, with which they can then be operated in a manner that is more stable. Here, it is also possible to recover targeted valuable substances, such as platinum catalysts, if they are used in certain processes, because their products are then recognized. Finally, the method can also be used outside of recycling to optically detect plastics, e.g., during product inspection—particularly for high-quality end products, with which various starting materials are combined.

To determine the fluorescence decay times, it is not necessary to record the entire exponential progression; rather, two or three punctiform or integrating intensity measurements (cumulation—summation—of the individual measurements, each over a defined duration) at different times are sufficient. For bi-exponential progression, three intensity measurements are required. In principle, additional measurements are also possible. This can further improve accuracy.

In doing so, the integration over a defined time span (expediently, measurements are taken prior to the first half-life and after the first half-life) is particularly advantageous, because the signal-to-noise ratio is significantly improved (the fluorescent light of the sample is used more efficiently). Assuming normal fluorescence decay times of approximately 5 ns, the measuring processes can be performed at intervals of one to two nanoseconds, with integration times of approximately one to two nanoseconds. Measurements with such a temporal resolution pose no problem in terms of electronics. The measuring process can be further simplified if the plastic sample is optically excited, not only once, but periodically. It can be assumed that, after approximately ten half-lives, the optical excitation has decayed to such an extent that a new excitation can take place without any disturbance; if one assumes an unfavorable case with a fluorescence decay time of 10 ns, this is achieved after approximately 70 ns. As such, the plastic sample can be optically excited periodically with a pulse sequence of 70 ns, i.e., with a repetition frequency of approximately 15 MHz. The two measurements for the determination of the fluorescence decay times can be carried out with a time shift—in particular, with successive pulses—and the requirements on the electronic components for the evaluation are thus further reduced.

The measurement can, advantageously, be carried out within a fluorescence decay process by the detection of the required integrated signals undertaken with a time-shifted periodic excitation, and in a manner triggered by the excitation pulse; here, for example, a separation can be carried out with several phase-sensitive detectors (PSD) working in parallel, via which the intensities can be measured by integrating over different time ranges of the decay curve. In doing so, it is not necessary to determine the absolute decay time. Device-specific raw data can also be used here, as long as it is sufficiently reproducible; with all devices used here, excellent reproducibility of the measured values has resulted, even as raw data (for example, not corrected by deconvolution). The unproblematic use of raw data simplifies the method even further.

Assuming that a recycled flake is 10 mm maximum in unfavorable cases, and that a 20 mm space is left between two flakes for good measure, more than 1,000 excitation pulses per flake would be available at a pulse sequence of 15 MHz and a feed rate of 140 m/s (for technological reasons, it should remain significantly below the speed of sound). If the pulses are averaged, the signal-to-noise ratio can be significantly improved, thus further increasing detection reliability. With a mass of 25 mg for a recycled flake (the value was obtained by averaging flakes from commercially available technical recycling material), one can, for example, then sort half a ton of material per hour with a sorting line without any problems. In many cases, such a high sorting capacity is not required; at lower sorting capacities, the demands on electronics and mechanics are considerably lower.

Using the fluorescence decay time of self-fluorescence—mono- and bi-, tri-, or higher-exponentially evaluated—plastics and their batches can be clearly identified and, in this way, mechanically sorted accurately by type for recycling purposes. This applies to all macromolecular substances that can thus be reused. Due to the high speed of the recognition process, possibilities are opened up for sorting systems with high material throughput. By using phase-sensitive detectors and integral measurements, the electronic effort for detection units can be designed favorably. Finally, the method for the detection of macromolecular substances can be used not only for recycling, but also for applications such as product inspection.

Using the fluorescence decay time of self-fluorescence—mono- and bi-, tri-, and/or higher-exponentially evaluated—PET materials can be clearly identified with respect to contamination by their previous use, and in this manner mechanically sorted accurately by type; this is of particular importance for distinguishing PET material contaminated with mineral oil products from non-contaminated material, above all, for use in the food industry.

Using the fluorescence decay time of self-fluorescence—in particular, bi-, tri-, and/or higher-exponentially evaluated—silicone materials can be classified and distinguished, as shown here with silicone elastomers and dehesive films. A refined evaluation allows conclusions to be drawn regarding the processing of the respective silicone. The different catalysts for the manufacturing of silicone dehesive material are reflected, in particular, in the $\tau_2$ time constant, which can be used to efficiently detect auxiliary materials such as platinum catalysts and recover them by type. Finally, the method can also be used for routine product inspection, as it can be easily automated.

Using the fluorescence decay time of self-fluorescence—mono- ($\tau$) and bi- ($\tau_1$, $\tau_2$), tri-, and/or higher-exponentially evaluated—the PE materials, LDPE, HDPE, and UHDPE, for example, can also be clearly identified and sorted by type.

In summary, an FLZA—thus, in particular, with the assistance of the fluorescence decay time constant—allows substances and/or their additives in or on materials to be easily and reliably distinguished. In particular, the measurement of the fluorescence lifespan—both in the case of a mono-exponential evaluation and in the case of a bi-, tri-, or even higher exponential evaluation—is possible in an easy manner with, at the same time, a high degree of reliability upon its determination. An additional advantage is that a FLZA—in particular, the measurement of the fluorescence lifespan—can be easily implemented, and can thus be used for the recycling of large quantities of plastics in particular. The FLZA and its evaluation requires only a few nanoseconds, such that, for example, plastic flakes can be reliably irradiated with light, e.g., on a conveyor belt, and the re-emitted and/or transmitted light can then be used for the FLZA.

Figure 7:
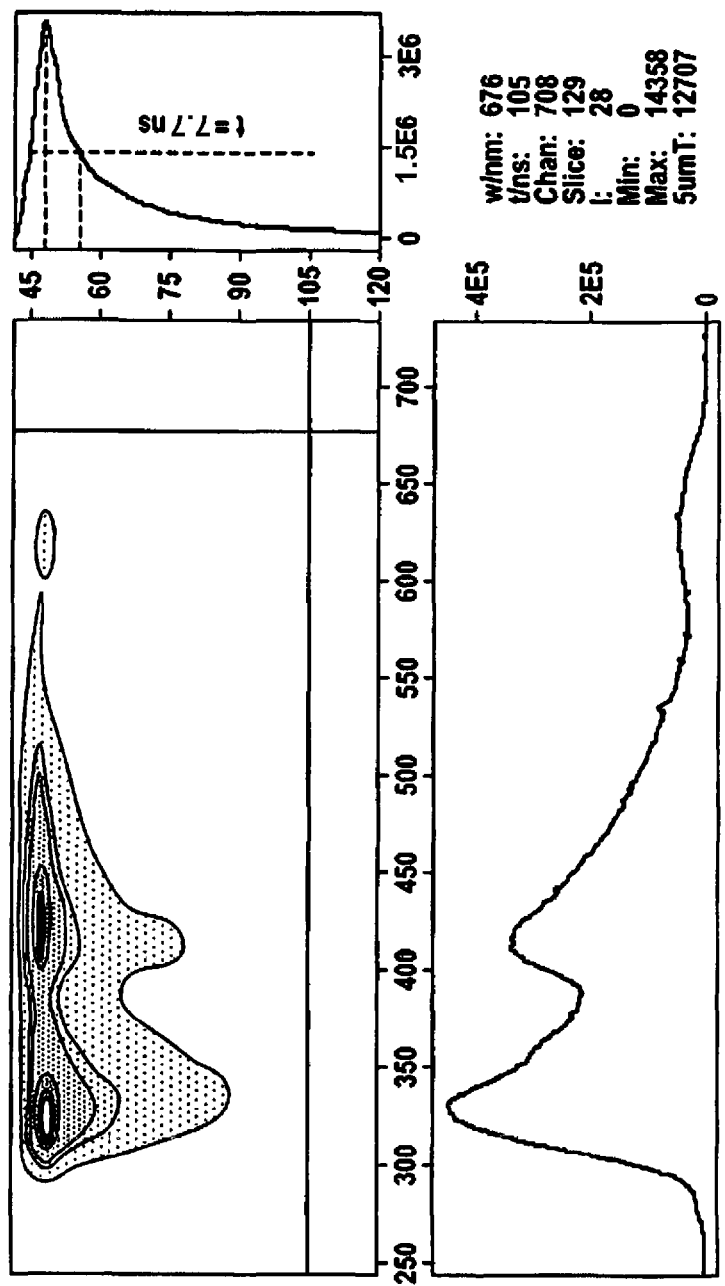
FIG. 7 is a graph illustrating a measurement of a fluorescence decay time constant of polystyrene.
Figure 8:
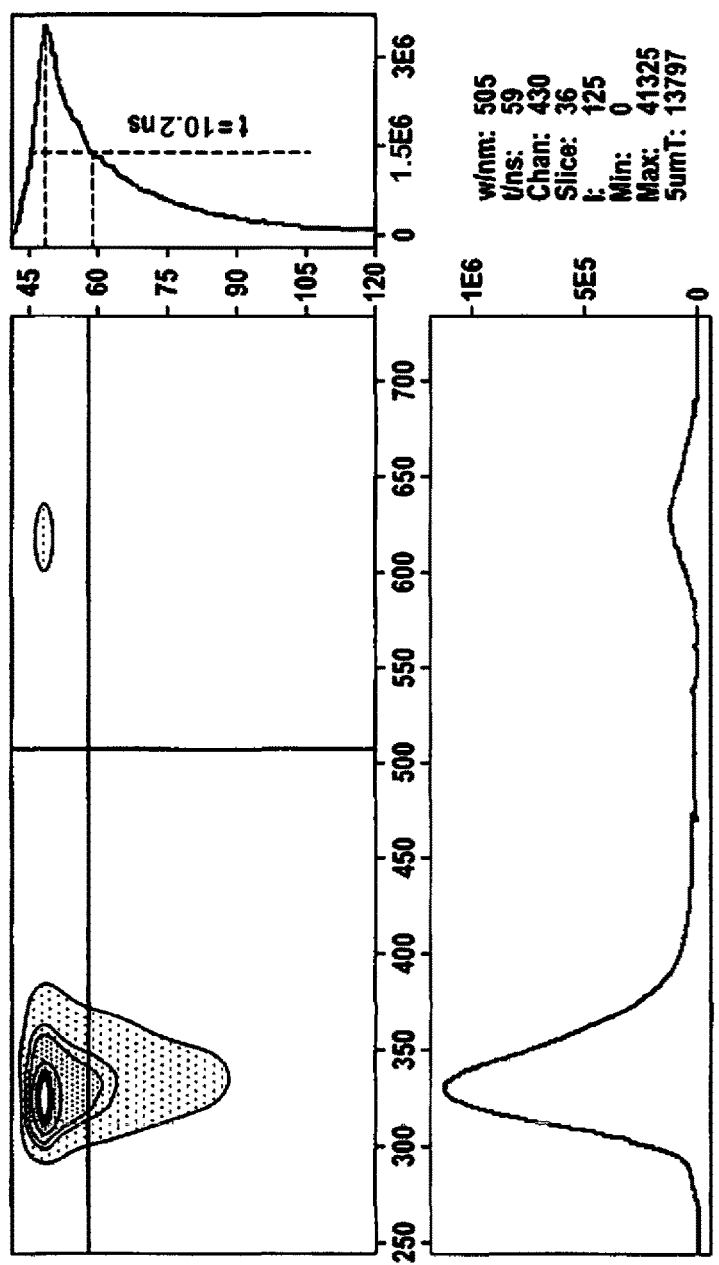
FIG. 8 is a graph illustrating a measurement of a sample of high impact polystyrene.

FIG. 7 and FIG. 8 show intensity distributions and fluorescence lifespan measurements of polystyrene (FIG. 7) and high impact polystyrene (HIPS) (FIG. 8). The upper left half shows a two-dimensional intensity distribution ("continuous plot"). At the bottom left, the corresponding one-dimensional intensity distribution is shown along a line in the spectrum from left to right. The intensity of fluorescence as a function of time is plotted on the upper right. This results in a decay time constant of 7.7 ns for polystyrene (FIG. 7) and, in FIG. 8, a decay time of 10.2 ns for high impact polystyrene.

In summary, the present disclosure features the advantage, among others, that it enables a particularly reliable identification of substances and/or their additives. In addition, the present disclosure has the advantage that it can be used to identify plastics in particular—especially in the field of recycling—quickly and in large quantities, and in an extremely reliable manner and, if necessary, to separate them from a material stream for further processing. An additional advantage is that substances—in particular, plastics or chemically similar substances—can be reliably distinguished.

With regard to other advantageous embodiments of the device according to the disclosure, to avoid repetition, reference is made to the general part of the description and also to the accompanying claims.

Finally, it must be expressly pointed out that the embodiments of the apparatus in accordance with the disclosure described above serve only as a discussion of the claimed teaching, but do not restrict it to the embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for identifying one or more substances in a material, comprising:
   at least one light source configured to irradiate a sample of the material with light of at least one wavelength, wherein the at least one light source emits light of at least two wavelengths, the at least two wavelengths including a first wavelength having a fundamental frequency and a second wavelength having a frequency that is an integer multiple of the fundamental frequency;
   a detector configured to detect light re-emitted or transmitted by the sample; and
   an analysis device configured to:
      analyze the detected light by at least one of: UV/VIS spectroscopy, fluorescence spectroscopy, or absorption spectroscopy;
      generate a first identification result for at least one substance of the sample; and
      generate a second identification result for the at least one substance in response to the first identification result being an ambiguous identification result, wherein the analysis device configured to generate the second identification result by fluorescence light decay time analysis (FLZA),
   wherein the analysis device at least partially identifies the at least one substance based on the first identification result or based on the first and second identification results, and
   wherein a measurement signal of the detected light, output by the detector, is integrated via physical signal integration by the analysis device over at least one time span to determine a fluorescence decay time constant, wherein the at least one time span lies within a time interval of only a falling edge of the measurement signal, and wherein at least one measurement is taken prior to the first half-life and at least one measurement is taken after the first half-life of the fluorescence decay time.

2. The apparatus according to claim 1, wherein a first wavelength of the at least two wavelengths is in a range between 233 nm and 300 nm, and a second wavelength of the at least two wavelengths is double the first wavelength.

3. The apparatus according to claim 1, wherein the at least one light source is configured to irradiate the sample in a first direction, and the detector is configured to detect light re-emitted or transmitted by the sample in a second direction, wherein the first direction and the second direction are different.

4. The apparatus according to claim 1, wherein the analysis device is configured to examine the first identification result for plausibility based on the second identification result.

5. The apparatus according to claim 1, wherein the at least one light source is a pulsed light source that produces light pulses having a pulse duration of more than 1 ns and less than 1 ms.

6. The apparatus according to claim 5, wherein the pulse duration of the at least one light source is adapted to a detection time of the re-emitted or transmitted light, and a distance between the light pulses corresponds to the detection time of the re-emitted or transmitted light by the detector.

7. The apparatus according to claim 1, wherein the detector is configured to detect the re-emitted or transmitted light in less than 10 nanoseconds.

8. The apparatus according to claim 1, wherein a transport device is arranged for feeding and discharging the sample.

9. The apparatus according to claim 1, wherein the detector is configured to divide a recorded spectrum into relevant and non-relevant areas for later analysis, discard the non-relevant areas, and insert FLZA-relevant data into the spectrum in place of the non-relevant areas.

10. The apparatus according to claim 1, wherein the analysis device is configured to determine and analyze multi-exponential fluorescence decay time constants by the FLZA.

11. The apparatus according to claim 10, further comprising an optical grating arranged in a detection beam path of the re-emitted or transmitted light, wherein a zero order of the light diffracted from the optical grating is used by the FLZA for determining the fluorescence decay time constants.

12. The apparatus according to claim 1, wherein the measurement signal is integrated over a plurality of non-overlapping time spans by the analysis device.

13. The apparatus according to claim 12, wherein the plurality of non-overlapping time spans have a same duration.

14. The apparatus according to claim 1, wherein the analysis device is connectible or connected to a storage device, the analysis device includes at least one integrator configured to integrate the measurement signal separately over two non-overlapping time spans, wherein values for the separately integrated measurement signal over two non-overlapping time spans are related to one another, and the analysis device at least partially identifies the at least one substance based on the related values of the measurement signal and reference relation values stored in the storage device.

15. The apparatus according to claim 14, wherein the two non-overlapping time spans are respectively assigned to successive irradiations of the sample with the light.

16. The apparatus according to claim 1, wherein the analysis device is configured to selectively integrate the measurement signal over the at least one time span prior to or after a normal half-life of a fluorescence lifespan.

17. The apparatus according to claim 1, wherein a fluorescence decay time constant of the at least one substance is determinable, and a duration of light pulses emitted by the at least one light source is less than the fluorescence decay time constant by at least a factor of 5.

18. The apparatus according to claim 1, wherein a sorting device is arranged to separate the identified at least one substance from a material stream of substances for recycling.

19. The apparatus according to claim 1, wherein the at least one light source is configured to irradiate the sample a plurality of times in succession with the light of the at least one wavelength, and the analysis device is configured to measure and analyze corresponding re-emitted or transmitted light a plurality of different times.

20. The apparatus according to claim 1, wherein the detection of the re-emitted or transmitted light is triggered by irradiating the sample with light by the at least one light source.

21. A method for identifying one or more substances in a material, comprising:
   irradiating, by at least one light source, a sample of the material with light of at least one wavelength, wherein the at least one light source emits light of at least two wavelengths, the at least two wavelengths including a first wavelength having a fundamental frequency and a second wavelength having a frequency that is an integer multiple of the fundamental frequency;
   detecting, by a detector, light re-emitted or transmitted by the sample;
   analyzing, by an analysis device, the detected light by at least one of: UV/VIS spectroscopy, fluorescence spectroscopy, or absorption spectroscopy;
   generating a first identification result for at least one substance in the sample based on the analysis of the detected light;
   generating a second identification result for the at least one substance based on a fluorescence light decay time analysis (FLZA) in response to the first identification result being an ambiguous identification result; and
   at least partly identifying the at least one substance based on the first identification result or based on the first and second identification results,
   wherein a measurement signal of the detected light, output by the detector, is integrated by physical signal integration by the analysis device over at least one time span to determine a fluorescence decay time constant, wherein the at least one time span lies within a time interval of only a falling edge of the measurement signal, and wherein at least one measurement is taken prior to the first half-life and at least one measurement is taken after the first half-life of the fluorescence decay time.

22. The method of claim 21, further comprising:
   examining, based on a fluorescence light decay time determined by the FLZA, a plausibility of the first identification result.

* * * * *